(12) United States Patent
Bester et al.

(10) Patent No.: US 9,165,078 B2
(45) Date of Patent: Oct. 20, 2015

(54) ROW-BASED DATA FILTERING AT A DATABASE LEVEL

(71) Applicant: INTERNATIONAL BUSINESS MACHINES CORPORATION, Armonk, NY (US)

(72) Inventors: Karla Bester, Ridgewood (AU); Allan T. Chandler, Floreat (AU); Mark A. Shewell, East Victoria Park (AU); Stephen J. Yates, Beaconsfield (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 282 days.

(21) Appl. No.: 13/826,906

(22) Filed: Mar. 14, 2013

(65) Prior Publication Data
US 2014/0280248 A1    Sep. 18, 2014

(51) Int. Cl.
*G06F 17/30*    (2006.01)

(52) U.S. Cl.
CPC .... *G06F 17/30867* (2013.01); *G06F 17/30345* (2013.01); *G06F 17/30699* (2013.01)

(58) Field of Classification Search
CPC ................ G06F 17/30345; G06F 17/30699
USPC .......................................................... 707/754
See application file for complete search history.

(56) References Cited

U.S. PATENT DOCUMENTS

| | | |
|---|---|---|
| 7,133,400 B1 | 11/2006 | Henderson et al. |
| 7,155,612 B2 | 12/2006 | Licis |
| 2001/0007104 A1 | 7/2001 | Goldberg |
| 2007/0078802 A1* | 4/2007 | Bestgen et al. .................. 707/1 |
| 2008/0120326 A1* | 5/2008 | Kearsey et al. ............... 707/102 |
| 2009/0006519 A1* | 1/2009 | Nandan et al. ................ 709/200 |
| 2010/0122026 A1 | 5/2010 | Umamageswaran et al. |
| 2011/0238642 A1 | 9/2011 | Catterall et al. |
| 2012/0185451 A1 | 7/2012 | Cho |

* cited by examiner

*Primary Examiner* — Jensen Hu
(74) *Attorney, Agent, or Firm* — Jeffrey S. Labaw; Amy J. Pattillo

(57) ABSTRACT

A database management system provides row based filtering of data at a database level by evaluating content of at least one record of a write data request received from an application for a particular table from among at least one table of a database, against at least one filter rule specified for the particular table. The database management system selects, for the at least one record, whether to store the at least one record of the write data request as a separate row in the particular table based on a separate action triggered for the at least one record when evaluated against the at least one filter rule specified for the particular table, each record not selected for storage being silently discarded.

20 Claims, 7 Drawing Sheets

```
--insert a filter rule
ALTER TABLE <tableName> INSERT FILTER <sequenceNum> "<filterRule>";          ← 700

--insert an existing filter rule
ALTER TABLE <tableName> EDIT FILTER <sequenceNum> "<filterRule>";

--remove a filter rule
ALTER TABLE <tableName> REMOVE FILTER <sequenceNum>;

--remove all filter rules
ALTER TABLE <tableName> REMOVE ALL FILTERS;

--show the current rules
SHOW FILTERS ON TABLE <tableName>;

<tableName> is the table to modify
<sequenceNum> is the sequence number of the filter rule
<filterRule> is the rule to follow to decide whether or not to filter the row
```

FIG. 7

```
-- Clear all filter rules for the table, start fresh
ALTER TABLE tempTable REMOVE ALL FILTERS;          ← 800

-- Allow all Australian rows
ALTER TABLE tempTable INSERT FILTER 1 "ALLOW:Country='Australia'"

-- Otherwise, deny all non-UK rows
ALTER TABLE tempTable INSERT FILTER 2 "DENY: COUNTRY<>'UK'"

--And, for UK rows, deny all that are not midday
ALTER TABLE tempTable INSERT FILTER 3 "DENY:TIME<>'12:00'"

-- UK MIDDAY TEMPERATURES = DEFAULT OF ALLOW
```

FIG. 8

```
-- Clear all filter rules for the table, start fresh          ← 900
ALTER TABLE <temp> REMOVE ALL FILTERS;

-- Allow all Australian rows
ALTER TABLE <tableName> INSERT FILTER 1 "ALLOW:Country='Australia'"

-- Otherwise, deny everything
ALTER TABLE <tableName> INSERT FILTER 2 "DENY:"

-- Default is effectively set to DENY because all records that are not allowed by filter 1, will be denied by filter 2.
```

FIG. 9

ROW-BASED DATA FILTERING AT A DATABASE LEVEL

1. TECHNICAL FIELD

The embodiment of the invention relates generally to database management systems and particularly to database level, row-based filtering of data before data enters a database table.

2. DESCRIPTION OF THE RELATED ART

A traditional database management system (DBMS) contains one or more databases, with each database containing one or more tables. The DBMS stores data in tables, where tables consist of zero or more rows and one or more columns of data. A column in a table generally includes data with a particular attribute. The rows in a table specify individual items or records within the table. Software applications use data manipulation instructions, such as instructions in the Structured Query Language (SQL), to insert, extract, or manipulate data within database tables. Software applications may generate data and call data manipulation instructions to insert the data within one or more tables of one or more DBMS, but it may not be efficient or necessary to actually store all the data specified in a data manipulation instruction, in a particular database.

BRIEF SUMMARY

Therefore, there is a need for a method, system, and computer program product, for database level, row based filtering of data before the filtered data is stored in a table of a database.

In one embodiment, a method for filtering data in an incoming write data request is directed to receiving a write data request by a filter write controller in a write layer of a database management system, the write data request passed to the filter write controller from a request interface of the database management system that receives a plurality of write data requests from one or more applications requesting to write data to one or more tables from among a plurality of tables of a database. The method is directed responsive to the filter write controller receiving the write data request, to determining whether a particular filter list in the write layer, associated with a particular table from among the plurality of tables specified in the write data request, comprises at least one filter rule, from among a plurality of filter lists each associated with a separate table from among the plurality of tables. The method is directed to responsive to detecting the particular filter list associated with the particular table comprises the at least one filter rule, evaluating content of the at least one record of the write data request for the particular table, against the at least one filter rule specified for the particular table in the particular filter list. The method is directed to selecting, by the filter write controller, whether to allow storage of the at least one record of the write data request as a separate row in the particular table based on a separate action triggered for the at least one record when evaluated against the at least one filter rule specified for the particular table, each record not selected for storage being silently discarded.

In another embodiment, a computer system comprises one or more processors, one or more computer-readable memories, and one or more computer-readable storage devices and program instructions, stored on at least one of the one or more storage devices for execution by at least one or more processors via at least one or more memories. The stored program instructions comprising program instructions to receive a write data request by a filter write controller in a write layer of a database management system, the write data request passed to the filter write controller from a request interface of the database management system that receives a plurality of write data requests from one or more applications requesting to write data to one or more tables from among a plurality of tables of a database. The stored program instructions comprising program instructions, responsive to the filter write controller receiving the write data request, to determine whether a particular filter list in the write layer, associated with a particular table from among the plurality of tables specified in the write data request, comprises at least one filter rule, from among a plurality of filter lists each associated with a separate table from among the plurality of tables. The stored program instructions comprising program instructions, responsive to detecting the particular filter list associated with the particular table comprises the at least one filter rule, to evaluate, by the filter write controller, content of the at least one record of the write data request for the particular table, against the at least one filter rule specified for the particular table in the particular filter list. The stored program instructions comprising program instructions, to select, by the filtering write controller, whether to allow storage of the at least one record of the write data request as a separate row in the particular table based on a separate action triggered for the at least one record when evaluated against the at least one filter rule specified for the particular table, each record not selected for storage being silently discarded.

In another embodiment, a computer program product for filtering data in an incoming write data request comprises one or more computer-readable storage devices and program instructions, stored on at least one of the one or more storage devices. The stored program instructions comprising program instructions to receive a write data request by a filter write controller in a write layer of a database management system, the write data request passed to the filter write controller from a request interface of the database management system that receives a plurality of write data requests from one or more applications requesting to write data to one or more tables from among a plurality of tables of a database. The stored program instructions comprising program instructions, responsive to the filter write controller receiving the write data request, to determine whether a particular filter list in the write layer, associated with a particular table from among the plurality of tables specified in the write data request, comprises at least one filter rule, from among a plurality of filter lists each associated with a separate table from among the plurality of tables. The stored program instructions comprising program instructions, responsive to detecting the particular filter list associated with the particular table comprises the at least one filter rule, to evaluate content of the at least one record of the write data request for the particular table, against the at least one filter rule specified for the particular table in the particular filter list. The stored program instructions comprising program instructions-to select whether to allow storage of the at least one record of the write data request as a separate row in the particular table based on a separate action triggered for the at least one record when evaluated against the at least one filter rule specified for the particular table.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 7 illustrates an example of alter table instructions for managing filters, by table name, in the table filters of a DBMS;

FIG. 8 illustrates one example of alter table instructions for specifying condition and action pairs of filter rules for a table with a default allow action;

FIG. 9 illustrates one example of alter table instructions for specifying condition and action pairs of filter rules for a table with an explicit default deny action;

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
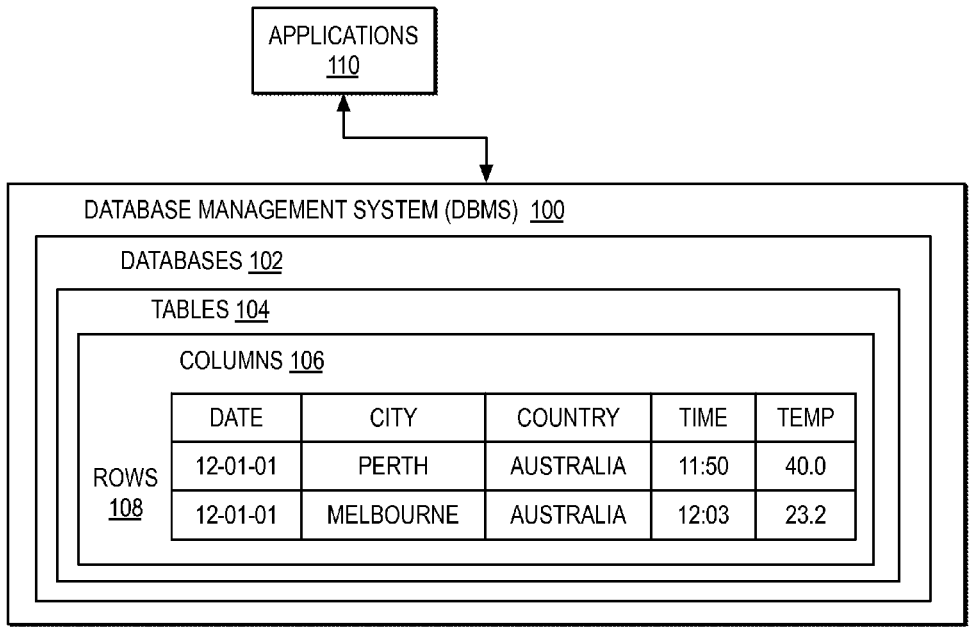
FIG. 1 illustrates a block diagram of one example of the layers of a database management system.

FIG. 1 illustrates a block diagram of one example of the layers of a database management system.

In the example, a database management system (DBMS) 100 contains one or more databases 102. Each database contains zero or more tables 104. Each table, if defined, contains one or more columns 106, which each column, if defined, is assigned one or more attributes. In the example, the attributes assigned to columns 106 are illustrated as "date", "city", "country", "time", and "temp". In addition, each table contains zero or more rows 108, where each row, if present, specifies an individual item of the data within a table. Tables 104 may include one or more tables with zero rows 108, representing an empty table. In the example, DBMS 100 provides one or more interfaces for receiving requests from applications 110. In the example, applications 110 include one or more applications, external to DBMS 100, that include database instructions to perform one or more function calls within DBMS 100 including, but not limited to, altering a table, reading data, and writing data. In another example, applications 110 may include one or more applications that generate a log file or other data source or access a log file or other data source generated by another application. In another embodiment, applications 110 may include one or more applications implemented in a layer of DBMS 100.

Figure 2:
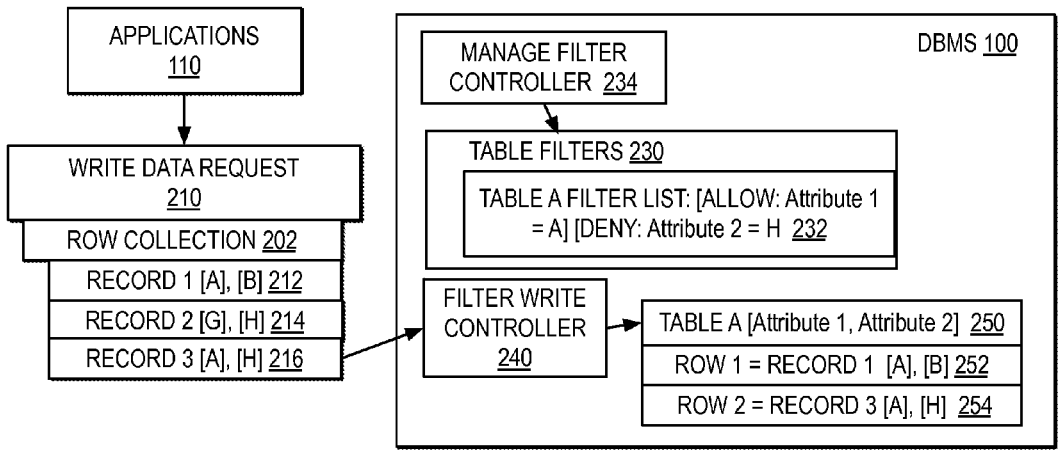
FIG. 2 illustrates a block diagram of one example of components for database level, row-based filtering of data before the filtered data is stored in a table of a database.

FIG. 2 illustrates a block diagram of one example of components for database level, row-based filtering of data before the filtered data is stored in a table of a database.

In the example, DBMS 100 receives a write data request 210 from applications 110. In the example, write data request 210 refers to a row collection 202 with multiple records, illustrated for purposes of example, as record 1 212, record 2 214, and record 3 216. In the example, row collection 202 may represent data located in a disk space or transmitted over a network. In the example, row collection 202 may represent data comprising a collection of one or more rows that DBMS 100 receives as a request to write into a table. The collection of one or more rows represented by row collection 202 may be collected in a log file or may be collected within and accessed from other types of data sources. In one example, a log file, also referred to as a log, is a file that includes a list of actions, files, requests, or other types of tracked or recorded data, accessible to applications 110.

In the example, for purposes of illustration, each of record 1 212, record 2 214, record 3 216 include data associated with a first attribute and a second attribute, where the data associated with a first attribute is stored in a first position and the data associated with a second attribute is stored in a second position. For example, record 1 212 includes data "A" associated with a first attribute and data "B" associated with a second attribute. Record 2 214 includes data "G" associated with a first attribute and data "H" associated with a second attribute. Record 3 216 includes data "A" associated with a first attribute and data "H" associated with a second attribute.

In the example, for purposes of illustration, DBMS 100 may include a table A 250, to which writing row collection 202 of write data request 210 is directed. In the example, table A 250 includes multiple columns, each set to a separate attribute. For purposes of illustration, table A 250 includes a first column set to an attribute of "attribute 1" and a second column set to an attribute of "attribute 2".

In the example, DBMS 100 includes filter write controller 240. DBMS 100 is configured to pass requests to enter data into tables of DBMS 100, such as write data request 210, to filter write controller 240. In the example, filter write controller 240 represents logic for filtering the data in write data request 210 prior to DBMS 100 storing of any of the data in write data request 210 within table A 250.

In the example, filter write controller 240 filters row collection 202 in write request 210 according to a filter list specified for the table to which row collection 202 is directed for storage, if a filter list is specified for the table. In the example, DBMS 100 is configured to store filter lists in table filters 230, where each filter list specifies one or more actions to perform on row collections when applications attempt to enter row collections into one or more tables. In the example, DBMS 100 is also configured with manage filter controller 234 that provides a method for one or more DBMS users to add one or more filter lists for a table to table filters 230. In particular, the example, table filters 230 includes a filter list for table A 250, illustrated as table A filter list 232. In one example, table filters 230 represents one or more table lists that have been added to one or more tables, where the tables include views, and the views are writable. In one example, a filter list in table filters 230 may apply to a single table or to multiple tables.

In particular, in the example, table A filter list 232 specifies two rules, to be applied in the order listed of "allow: attribute 1=A" and "deny: attribute 2=H". In the example, filter write controller 240 applies the rules to write data request 210, by row. In the example, the data in record 1 212 matches the first rule "attribute 1=A", so record 1 212 is allowed for storage in table A 250 in row 1 252. In the example, the data in record 2 214 does not match the first rule "attribute 1=A", but record 2 214 does match "attribute 2=H", therefore record 2 214 is denied, and not written to table A 250 by being silently discarded by filter write controller 240. In the example, the data in record 3 216 matches the first rule "attribute 1=A", so record 1 216 is allowed for storage in table A 250 in row 2 254, even though "attribute 2=H". The example of record 3 216 illustrates an example where if a filter rule condition is true, any remaining filter rules are not evaluated for the record, even if the remaining filter rules would be true if evaluated against the content of a record. In addition, the example of record 3 216 illustrates that the current filter rules allowed in table A filter list 232 allow for storage of all records with "attribute 1=A", regardless of the content of "attribute 2", but do not allow for storage of any records that do not have content of "attribute 1=A", but do have content of "attribute 2=H".

In the example, if DBMS 100 handled write data request 210 using traditional write logic, then all the records in row collection 202 of write data request 210 would be added as rows to table A 250. In contrast, when filter write controller 240 handles write data requests at the database level, applying row based filtering based on a filter list of rules specified for the table in table filters 230, table A 250 only includes a selection of the records in row collection 202 of write data request of record 1 212 and record 3 216. In the example, even when filter write controller 240 is implemented, if no filter is specified for a table that is the target of a write data request in table filters 230, then traditional write logic would handle write data request 210.

In the example, as illustrated, filter write controller 240 filters data based on the content of each record compared with content-based filtering rules specified for a table in table filters 230. In the example, DBMS 100 may also include a security controller, which prevents database users from changing certain columns within tables, based on the identity of the user requesting the write request and the level of write access the user identity is granted. In addition, DBMS 100 may also include a security controller for restricting the options for adding, modifying, or removing filter rules to a filter list of a table based on the identity of the user requesting to modify the filter rules and the level of filter rule modification the user identity is granted.

Figure 3:
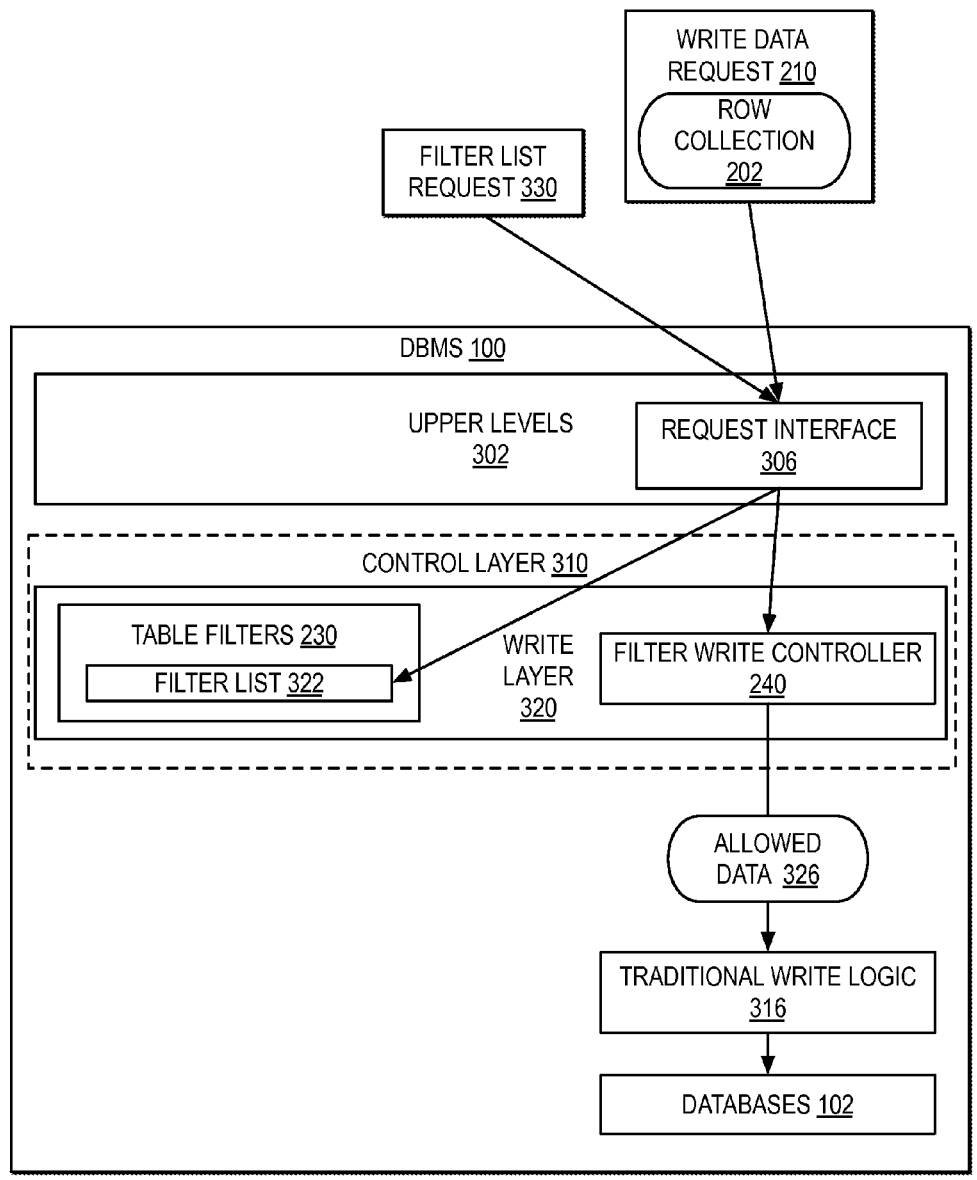
FIG. 3 illustrates a block diagram of one example of layers of a DBMS implementing database level, row-based data filtering components.

FIG. 3 illustrates a block diagram of one example of layers of a DBMS implementing database level, row-based data filtering components.

In the example, a DBMS 100 comprises upper levels 302 operating on top of a control layer 310, which operates on top of databases 102. In the example, upper levels 302 may include, but are not limited to, one or more interfaces and one or more applications. In one example, upper levels 302 includes one or more application programming interfaces, such as request interface 306. In the example, applications 110, implemented external to DBMS 100, send calls to DBMS through request interface 306.

In the example, request interface 306 may receive multiple types of requests including, but not limited to, filter requests, such as filter list request 330, write data requests, such as write data request 210, and other database requests, such as read data requests. In the example, when request interface 306 receives an incoming request, request interface 306 identifies the type of request and directs the request to one or more components of control layer 310, to perform the requested action.

In one example, request interface 306 receives filter list request 330, identifies that filter list request 330 is of a filter request type, and directs control layer 310 to perform the requested action in table filters 230 of a write layer 320. Filter list request 330 may include requests for one or more types of actions, including but not limited, to insert a filter list 322 into table filters 230, to edit filter list 322, to remove filter list 322, to remove all filter lists in table filters 230, and to show the filter lists currently in table filters 230. Filter list 322 may include one or more tables associated with filter list 322, one or more filtering rules to apply, and a sequential ordering of the filtering rules. A filtering rule may apply to a single column attribute or to multiple column attributes. In the example, a filtering rule may positively recite the content, by attribute, which is allowed or negatively recite the content, by attribute, which is not allowed. For example, each filtering rule may specify a particular content element, multiple content elements, or a range of content elements. In the example, manage filter controller 234 is implemented through request interface 306.

In the example, request interface 306 receives write data request 210, identifies write data request 210 is of a write data type, and passes write data request 210 to filter write controller 240 of write layer 320 of control layer 310. In the example, filter write controller 240 identifies the table that is the target of write data request 210 and searches table filters 230 for a filter list specified for the target table. If table filters 230 does not include a filter list for the target table, filter write controller 240 passes write data request 210, with row collection 202, to traditional write logic 316. Traditional write logic 316 controls writing all of the data passed in row collection 202 of write data request 210, to the target table in databases 102. In the example, if table filters 230 does include a filter list for the target table, filter write controller 240 filters each record in row collection 202 of write data request 210 according to the rules in the filter list for the target table, filtering out any records that do not meet the requirements in the filter list for the target table. Filter write controller 240 passes allowed data 326 to traditional write logic 316 control writing the selection of data allowed in write data request 210, to the target table in databases 102. In one example, allowed data 326 only includes a selection of the records from among row collection 202 to be written to databases 102. In another example, allowed data 326 includes all the records from row collection 202.

Figure 4:
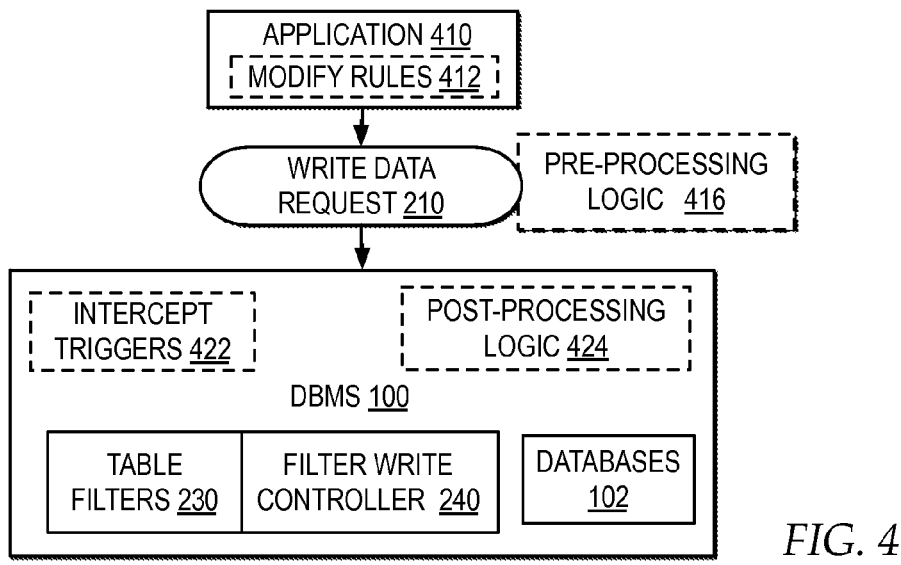
FIG. 4 illustrates a block diagram of one example of a comparison of database level, row based filtering with other types of data filtering in layers other than the write layer of a DBMS.

FIG. 4 illustrates a block diagram of one example of a comparison of database level, row based filtering with other types of data filtering in layers other than the write layer of a DBMS.

In the example, an application 410, such as one of the application illustrated in applications 110, uses data manipulation instructions to insert, extract, or manipulate selections of data into DBMS 100. A DBMS user may prefer not to process or store all the data specified in a data manipulation instruction in DBMS 100. In particular, a DBMS user, which may include a DBMS administrator, may have multiple types of reasons for not wanting to store the content included in certain data records from the data specified in a data manipulation instruction, within a table of DBMS 100. In one example of a reason for not wanting to store certain data records from the data specified in a data manipulation instruction, a DBMS user may prefer to reduce the amount of database storage actually used by databases 102 by not storing records received in selections of data that include content that is deemed unimportant by the DBMS user. In another example of a reason for not wanting to store certain data records from the data specified in a data manipulation instruction, a DBMS user may need to prevent particular types of content in the data records, which need to be secured, from being stored in DBMS 100.

In one example of the types of data content that a DBMS user may deem unimportant, application 410 may output write data request 210 with row collection 202 containing temperatures recorded on every city of the planet, every minute of the day, for many days. A DBMS user may be interested in only those cities within a certain country and may be interested in data only from those dates less than a month old. The DBMS user may only want to store those records within the files that are for the specified cities within the specified time period.

In another example of the types of data content that a DBMS user may need to prevent before being stored in DBMS 100, application 410 may output write data request 210 with row collection 202 referencing a distributed system performance log file, including, but not limited to, a System Management Facility (SMF) log, which may contain the performance details of many systems. In one example, a distributed system performance monitoring application, such as SMF, is a component of a distributed computing system, including multiple computer systems. In one example, the performance monitoring application may collect system and job-related information on the distributed computing system and provide a standard method for recording distributed system performance logs listing activity indicating the performance of the system and other job-related information. For example, the types of activity recorded may include, but are not limited to, performance and usage instrumentation of resources such as processor, memory, disk, cache, workload, network activity, software usage, error conditions, workload, and virtual storage The DBMS user may need to restrict what data is entered into the database from the distributed system performance log, such as restricting the data written to databases 102 to only the records associated with a particular, unsecured system, from among the multiple systems or to only records for a certain time range within the day.

As described in FIGS. 2 and 3, by implementing filter write controller 240 for applying a filter list specified for a target table of a write data request in table filters 230, filter write controller 240 applies database level, row based filtering of data in row collection 202 to avoid storing filtered data records in databases 102.

In addition to implementing filter write controller 240 for row based filtering of data from application 410 at a database level, application 410 may filter data from row collection 202. For example, application 410 may apply modify rules 412 at the application level to remove unwanted data records from row collection 202 before row collection 202 enters DBMS 100. One limitation of performing data filtering at the application level through modify rules 412 is that a party, which does not include the DBMS user, may develop application 410 and the party that provides application 410 would be required to offer an option to third party users, such as the DBMS user, to select to modify row collection 202 or specify modify rules 412. The party that provides application 410 may not want to provide third party users with the option to make modifications of rules or data at the application level for multiple reasons. For example, the party that provides application 410 may not want to provide third party users with the option to make modifications of rules or data at the application level because the party that provides application 410 would also need to provide additional code and system resources for handling inputs of modify rules 412, for handling the processing of modify rules 412 on row collection 202, and for providing data and application security. In another example, the party that provides application 410 may not want to provide third party users with the option to make modifications of rules or data at the application level because the party may provide the data in row collection 202 to multiple database users and may not want to manage different instances of row collection 202, modified for different database users.

In addition to implementing filter write controller 240 for row based filtering of data from application 410 at a database level, pre-processing logic 416 may be implemented to pre-process row collection 202 for write data request 210 outside of application 410 to remove unwanted data records from row collection 202 before row collection 202 enters DBMS 100. Row collection 202 output by application 410 may be pre-processed, separate from DBMS 100, to remove information from row collection 202 that the DBMS user does not want processed and stored in DBMS 100. One limitation of pre-processing logic 416 is that pre-processing logic 416 is another piece of code that has to be written and maintained, separate from the DBMS 100, which costs money and time. Another limitation of pre-processing logic 416 is that the relationship between the row collection 202 and what the DBMS writes to the database may be complex, introducing possible errors and additional layers of processing, particularly where an application has to perform data look ups and certain information may not be known for writing to databases 102 until upper levels 302 has processed row collection 202. Duplicating the lookups and calculations of data in pre-processing logic 416 and upper levels 302 increases the risk of errors when performing complex writes. Another limitation of pre-processing logic 416 is that there may not be a point at which row collection 202 can be modified. For example, if row collection 202 is stored on a disk, pre-processing logic 416 may modify row collection 202 on the disk, but if row collection 202 is accessed from the internet at run time, for pre-processing logic 416 to process data retrieved from the internet at run time, pre-processing logic 416 will require complex network interception programs, increasing the time, cost, and resources required for implementing pre-processing logic 416. In contrast, while filter write controller 240 is an additional piece of code, filter write controller 240 is maintained within DBMS 100, not external to DBMS 100 and filter write controller 240 performs complex database writes, including lookups, within control layer 310 of DBMS 100, with direct access to databases 102 for lookups, reducing the risk of errors when filtering complex write data requests.

In addition to implementing filter write controller 240 for row based filtering of data from applications 410 at a database level, post-processing logic 424 may be implemented to filter records out of databases 102, after row collection 202 is stored in databases 102. One limitation of post-processing logic 424 is that by allowing all data in row collection 202 to enter databases 102, DBMS 100 uses processing resources to process all the data in row collection 202 for storage in databases 102 and has to allocate space for all the data in row collection 202 for storage in databases 102, which may trigger use of pay per use on-demand storage space or use of data storage management techniques to open up space for all the data in row collection 202, and the same data has to be processed a second time, after being stored in databases 102, to remove the data from databases 102. In addition, another limitation of post-processing logic 424 is that by allowing all data in row collection 202 to enter databases 102, if row collection 202 includes data, the content of which needs to be secured or is considered sensitive subject matter, the sensitive data would still exist in database 202, even if just for a temporary period of time, triggering potential data breach or legal issues. In contrast, filter write controller 240 processes row collection 202, prior to storage, to select which records within row collection 202 are approved for storage, such that only selected records from row collection 202 are then processed and stored in databases 102 and such that a DBMS user may specify filtering rules, at a table level, to keep sensitive content received in row collection 202 from being stored in databases 102 at all.

In addition to implementing filter write controller 240 for row based filtering of data from applications 410 at a database level, DBMS 100 may implement intercept triggers 422 that intercept inserts or updates and filter the inserts or updates, where the inserts and updates represent database objects. Intercept triggers 422 may be implemented at one or more points of DBMS 100 or the systems on which DBMS 100 operates, including, but not limited to, a database memory layer, a network layer, an operating system layer, and a database library layer. Intercept triggers 422 can be set for general purpose user tasks, along with data filtering, and in one example, an intercept trigger generally runs a process which may do anything to decide whether or not an event should happen or whether the event should be modified before happening. One limitation of using intercept triggers 422 as the tool used to filter data in DBMS 100 is that all the database objects, whether triggered for general purpose user tasks or data filtering, need to be synchronized, and the synchronization of database objects requires additional processing. In addition, a limitation of using intercept triggers 422 for filtering data is that intercept triggers 422 are used for multiple purposes and therefore triggers require greater functionality and generic processing, and cannot be fully optimized for data filtering processes alone. In contrast to intercept triggers 422, request interface 306 provides a simple application programming interface (API) through which filters are added to table filters 230, providing an API that may be optimized for performing filtering operations alone. In one example, data filtering through request interface 306, table filters 230, and filter write controller 240 may be optimized, particularly in comparison to intercept triggers 422, because request interface 306, table filters 230, and filter write controller 240 do not have the overhead of greater functionality and generic processing that may be required by intercept triggers 422. In addition, in contrast to intercept triggers 422, request interface 306 provides a simple API through which write data requests are passed to filter write controller 240, in control layer 310, without requiring the use of insert and update triggers for performing filtering, such that no database object synchronization is required for filtering data. Further, in contrast to intercept triggers 422, the coded implementation of request interface 306, table filters 230, and filter write controller 240 may be optimized for data filtering, particularly in comparison to intercept triggers 422 because request interface 306, table filters 230, and filter write controller 240 do not have the overhead of handling generic rules that may be required by intercept triggers 422. For example, table filters 230 may be specifically tailored, in a specified format, to either allow or deny database writes based on row content. The filter lists, all tailored to a specified format within table filters 230, may be further optimized by being compiled into an intermediate form, to allow for faster execution as filter write controller 240 evaluates filter rules against write requests. In addition, table filters 230 may be further optimized in that the column names in filter lists, all tailored to the specified format, may be converted into numeric column identifiers, to allow for faster execution as filter write controller 240 evaluates filter rules against write requests.

As illustrated, modify rules 412, pre-processing logic 416, post-processing logic 424, and intercept triggers 422 may be implemented as options for filtering data that a user prefers not to store in databases 102, however, each of these options has limitations. In contrast, filter write controller 240, by applying table filters 230, for database level, row-based data filtering, provides a simple, efficient, centralized function of DBMS 100, that is easy to manage by DBMS 100, that allows a DBMS user to specify filtering rules in table filters 230, that does not place filtering at the general purpose object level, that filters data prior to storage, and that requires no changes at the application level and is not distributed across multiple applications at the application level. By implementing filter write controller 240, for applying table filters 230 to tables of the database, the storage requirements for databases 102 may be reduced because storage space is not required in databases 102 for data that is specified by the table filters as unnecessary.

Figure 5:
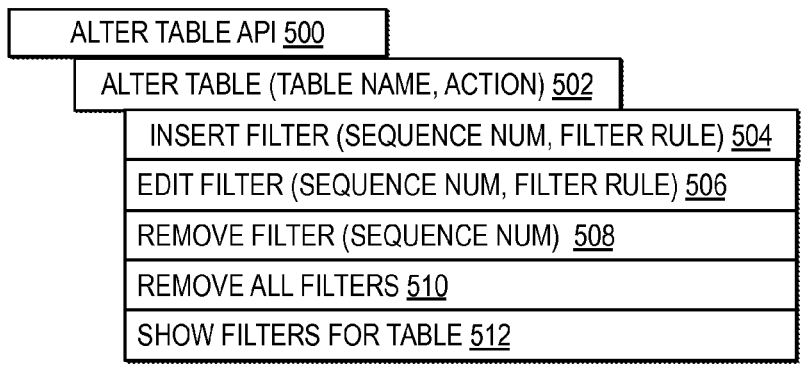
FIG. 5 illustrates a block diagram of one example of an alter table application programming interface (API) of a request interface modified to handle filtering list requests, along with handling alter table requests.

FIG. 5 illustrates a block diagram of one example of an alter table API of a request interface modified to handle filtering list requests, along with handling alter table requests.

In the example, request interface 306 may implement an alter table API 500 for handling ALTER TABLE calls, as illustrated at reference numeral 502. In a DBMS, traditionally request interface 306 includes an API that handles ALTER TABLE calls that specify a table name (table name) to be altered and a table alteration (action) requested, as illustrated at reference numeral 502.

In the example illustrated, alter table API 500 is modified to also handle, with an alter table call, one or more specific types of calls for managing filter list requests, such as filter list request 330. For example, as illustrated at reference numeral 504, alter table API 500 may handle a call of "insert filter" for inserting a filter list into table filters 230. In the example, as illustrated at reference numeral 504, an "insert filter" call may specify one or more filter rules and specify, for each filter rule, a sequence number of the position of the filter rule to be applied in a sequence of filter rules in a filter list for a table. In the example, as illustrated at reference numeral 506, alter table API 500 may also handle a call of "edit filter" for editing a filter list in table filters 230, where an "edit filter" call may also specify the sequence number assigned to a filter rule and the edited filter rule.

As illustrated at reference numeral 508, alter table API 500 may handle a "remove filter" call for removing a filter assigned a particular sequence number and specified by the table name in the alter table call. As illustrated at reference numeral 510, alter table API 500 may handle a "remove all filters" call for removing all filters for the table name in the alter table call in table filters 230. In addition, as illustrated at reference numeral 512, alter table API 500 may handle a "show filters for table" call for showing all the filter rules for a table name in the alter table call.

In addition to the calls illustrated, alter table API 500 may handle additional or alternate table and filter list related calls and actions. In addition, in addition to the call parameters illustrated, alter table API 500 may handle calls specified by additional or alternate call parameters, including, but not limited to, a DBMS user identifier and a time identifier.

In another example, one or more of the calls illustrated at reference numerals 504, 506, 508, 510, and 512 may be handled by alter table API 500 under a different call from the "alter table" call illustrated at reference numeral 502. For example, the "show filters for table" call illustrated at reference numeral 512 may be handled by alter table API 500 under a call separate from the "alter table" call illustrated at reference numeral 502. In another example, one or more of the calls illustrated at reference numerals 504, 506, 508, 510, and 512 may be handled by an additional or alternate API implemented in request interface 306. For example, in addition to request interface 306 implementing alter table API 500 for handling calls related to table filters 230, request interface 306 may implement one or more additional APIs for handling specific calls for table filters 230. For example, the "show filters for table" call illustrated at reference numeral 512 may be handled by an additional API in request interface 306 for handling show-type requests. Moreover, while in the example, alter table API 500 includes additional commands under the "alter table" call for managing table filters 230, one of ordinary skill in the art will appreciate that other call commands may be modified to handle calls related to managing table filters 230.

Figure 6:
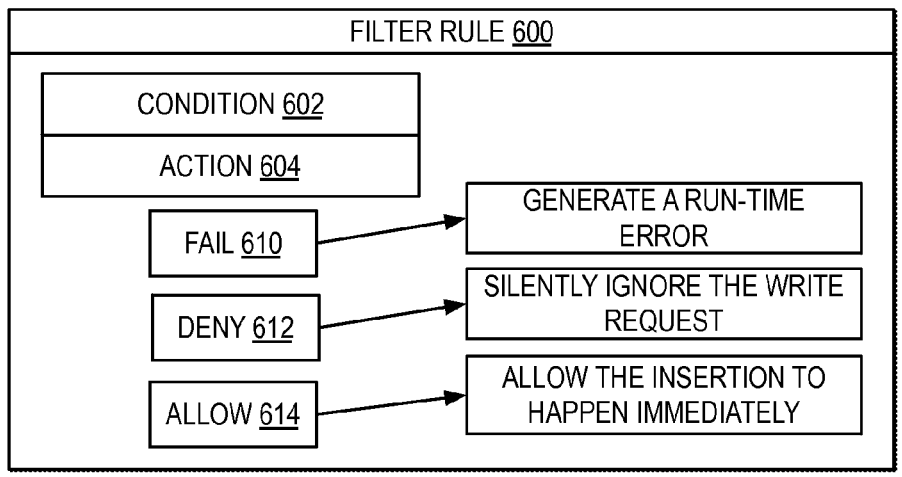
FIG. 6 illustrates a block diagram of one example of elements of a filter rule of a filter list for a table.

FIG. 6 illustrates a block diagram of one example of elements of a filter rule of a filter list for a table. In the example, a filter rule 600 includes at least one condition/action pair, illustrated by a condition 602 and an action 604. Each filter rule 600 is processed in the order of the sequence number assigned to the filter rule to decide if a specific record should be entered as a row in a database table.

Condition 602 may represent any expression that generates a true or false value, which decides whether action 604 is carried out. Condition 602 may include an expression that evaluates whether the data in a record of a row collection includes particular content. The expression in condition 602 may be further specified to evaluate whether the data in a record, to be associated with a particular column attribute in a table, includes particular content. In addition, the expression in condition 602 may be complex or simple, may use many input sources, both from the record being examined in row collection 202 and any other information available to DBMS 100.

Action 604 may include one or more actions, including, but not limited to, fail 610, which will generate a run-time error, deny 612, which will trigger filter write controller 240 to silently ignore the write request, dropping the record from being inserted into the table, and allow 614, which will trigger filter write controller 240 to allow the insertion of the record into the table to happen immediately.

In one example, whether there is a single filter rule or multiple filter rules in a filter list for a table, as the filter rules are examined in sequential order for each record, if a condition of a trigger rule is evaluated as true, the paired action is the action that is carried out for the triggering record, without examining any remaining filter rules. In one example, if none of the conditions of any trigger rules for a table are evaluated as true for a particular record, then a default action is carried out.

FIG. 7 illustrates an example of alter table instructions for managing filters, by table name, in the table filters of a DBMS. In the example, alter table instructions 700 illustrates a first instruction of "ALTER TABLE <tableName> INSERT FILTER <sequenceNum> "<filterRule>"" to insert a filter rule for a selected table name into table filters 230. In the example, alter table instructions 700 illustrates a second instruction of "ALTER TABLE <tableName> EDIT FILTER <sequenceNum> "<filterRule>"" to edit an existing filter rule assigned a selected sequence number for a selected table name within table filters 230. In the example, alter table instructions 700 illustrates a third instruction of "ALTER TABLE <tableName> REMOVE FILTER <sequenceNum>" to remove a filter rule assigned a selected sequence number for a selected table name from table filters 230. In the example, alter table instructions 700 illustrates a fourth instruction of "ALTER TABLE <tableName> REMOVE ALL FILTERS" to remove all the filter rules for a selected table name within table filters 230. In the example, alter table instructions 700 illustrates a fifth instruction of "SHOW FILTERS ON TABLE <tableName>" to show the current rules for a selected table within table filters 230.

FIG. 8 illustrates one example of alter table instructions for specifying condition and action pairs of filter rules for a table with a default allow action. In the example, alter table instructions 800 illustrates an example of alter table instructions specified for setting the condition and action pairs of filter rules for a table.

Alter table instructions 800 illustrate one example of the alter table calls specified by a DBMS user for a temperature table "tempTable". In the example, row collection 202 for the tempTable includes temperatures from multiple cities in every country, every hour, for multiple days. In the example, the DBMS user may prefer to store, in the tempTable, the records from row collection 202 that are for any cities in Australia and that are for cities in the UK, but only the midday temperatures for the UK.

In the example, alter table instructions 800 illustrates a first instruction of "ALTER TABLE tempTable REMOVE ALL FILTERS", to remove all the filters for the selected table and start without any filter rules for the selected table.

In the example, alter table instructions 800 illustrates a second instruction of "ALTER TABLE tempTable INSERT FILTER 1 "ALLOW: Country='Australia'"", where "1" is the sequenceNum of the filter rule and "ALLOW: Country='Australia'" is the filterRule inserted into table filters 230 for the table tempTable. In the example, "Country" represents a column attribute of a table and 'Australia' represents content that may be in a record. In the example, if the condition of "Country='Australia'" is true, then the action of "ALLOW" is triggered, where if the action of "ALLOW" is triggered, filter write controller 240 allows the matching record to be written immediately to databases 102 and the remaining filter rules are not evaluated for the record.

In the example, alter table instructions 800 illustrates a third instruction of "ALTER TABLE tempTable INSERT FILTER 2 "DENY: Country< >'UK'"", where "2" is the sequenceNum of the filter rule and "DENY: Country< >'UK'" is the filterRule inserted into table filters 230 for the table tempTable. In the example, "Country" represents a column attribute of a table and 'UK' represents content that may be in a record. In the example, "< >" is a "not equal" operand. In the example, if the condition of "DENY: Country<>'UK'" is true, meaning that the country data is for any country other than "UK", then the action of "DENY" is triggered, where if the action of "DENY" is triggered, filter write controller 240 silently drops the matching record, effectively blocking the matching record from being inserted in databases 102, and the remaining filter rules are not evaluated for the record.

In the example, alter table instructions 800 illustrates a fourth instruction of "ALTER TABLE tempTable INSERT FILTER 3 "DENY: Time< >'12:00'"", where "3" is the sequenceNum of the filter rule and "DENY: Time<>'12:00'" is the filterRule inserted into table filters 230 for the table tempTable. In the example, "Time" represents a column attribute of a table and '12:00' represents content that may be in a record. In the example, if the condition of "DENY: Time<>'12:00'" is true, meaning that the time for a record is not a midday time of '12:00', then the action of "DENY" is triggered, where if the action of "DENY" is triggered, filter write controller 240 silently drops the matching record, effectively blocking the matching record from being inserted in databases 102.

In the example, the effect of the three filter rules illustrated in alter table instructions 800 is that for a row collection received for the tempTable, any records with a country attribute of "Australia" are allowed to be inserted into the tempTable, any records with a country attribute of "UK" and a time attribute of "12:00" are allowed to be inserted into the tempTable, and all other records are silently dropped and not inserted into the tempTable.

FIG. 9 illustrates one example of alter table instructions for specifying condition and action pairs of filter rules for a table with an explicit default deny action. In the example, alter table instructions 900 illustrates an example of alter table instructions specified for setting the condition and action pairs of filter rules for a table.

Alter table instructions 900 illustrate one example of the alter table calls specified by a DBMS user for the temperature table "tempTable". In the example, row collection 202 for the tempTable includes temperatures from multiple cities in every country, every hour, for multiple days. In the example, the DBMS user may prefer to store, in the tempTable, the records from row collection 202 that are for any cities in Australia only.

In the example, alter table instructions 900 illustrates a first instruction of "ALTER TABLE tempTable REMOVE ALL FILTERS", to remove all the filters for the selected table and start without any filter rules for the selected table.

In the example, alter table instructions 900 illustrates a second instruction of "ALTER TABLE tempTable INSERT FILTER 1 "ALLOW: Country='Australia'"", where "1" is the sequenceNum of the filter rule and "ALLOW: Country='Australia'" is the filterRule inserted into table filters 230 for the table tempTable. In the example, "Country" represents a column attribute of a table and 'Australia' represents content that may be in a record. In the example, if the condition of "Country='Australia'" is true, then the action of "ALLOW" is triggered, where if the action of "ALLOW" is triggered, filter write controller 240 allows the matching record to be written immediately to databases 102 and the remaining filter rules are not evaluated for the record.

In the example, alter table instructions 900 illustrates a third instruction of "ALTER TABLE tempTable INSERT FILTER 2 "DENY:"", where "2" is the sequenceNum of the filter rule and "DENY:" is the filterRule inserted into table filters 230 for the table tempTable. In the example, there is no condition set, therefore any record that is not allowed by filterRule 1 will be evaluated against filterRule 2 and evaluated as "true". In the example, each record evaluated against filterRule 2 as "true" triggers the action of "DENY", where if the action of "DENY" is triggered, filter write controller 240 silently drops the matching record, effectively blocking the matching record from being inserted in databases 102. Effectively, the third instruction of "DENY:" explicitly sets the default action to "DENY" for any record that is not allowed under filterRule1.

Figure 10:
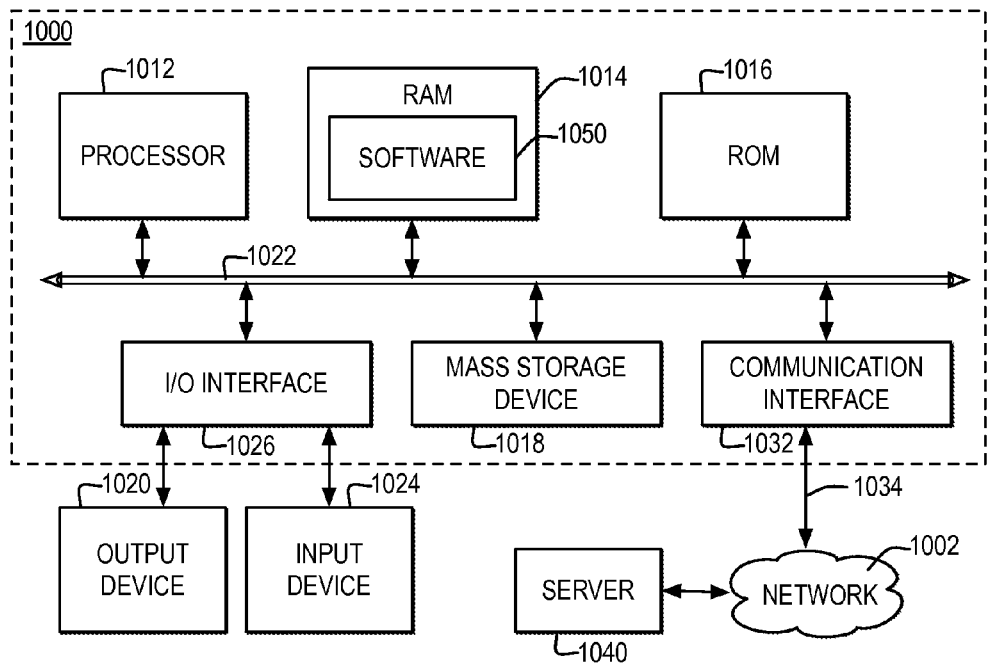
FIG. 10 illustrates a block diagram of one example of a computer system in which one embodiment of the invention may be implemented.

FIG. 10 illustrates a block diagram of one example of a computer system in which one embodiment of the invention may be implemented. The present invention, including, but not limited to, applications 110 and DBMS 100, may be performed in a variety of systems and combinations of systems, made up of functional components, such as the functional components described with reference to a computer system 1000 and may be communicatively connected to a network, such as network 1002.

Computer system 1000 includes a bus 1022 or other communication device for communicating information within computer system 1000, and at least one hardware processing device, such as processor 1012, coupled to bus 1022 for processing information. Bus 1022 preferably includes low-latency and higher latency paths that are connected by bridges and adapters and controlled within computer system 1000 by multiple bus controllers. When implemented as a server or node, computer system 1000 may include multiple processors designed to improve network servicing power. Where multiple processors share bus 1022, additional controllers (not depicted) for managing bus access and locks may be implemented.

Processor 1012 may be at least one general-purpose processor such as IBM® PowerPC® processor that, during normal operation, processes data under the control of software 1050, which may include at least one of application software, an operating system, middleware, and other code and computer executable programs accessible from a dynamic storage device such as random access memory (RAM) 1014, a static storage device such as Read Only Memory (ROM) 1016, a data storage device, such as mass storage device 1018, or other data storage medium. Software 1050 may include, but is not limited to, code, applications, protocols, interfaces, and processes for controlling one or more systems within a network including, but not limited to, an adapter, a switch, a server, a cluster system, and a grid environment.

Figure 11:
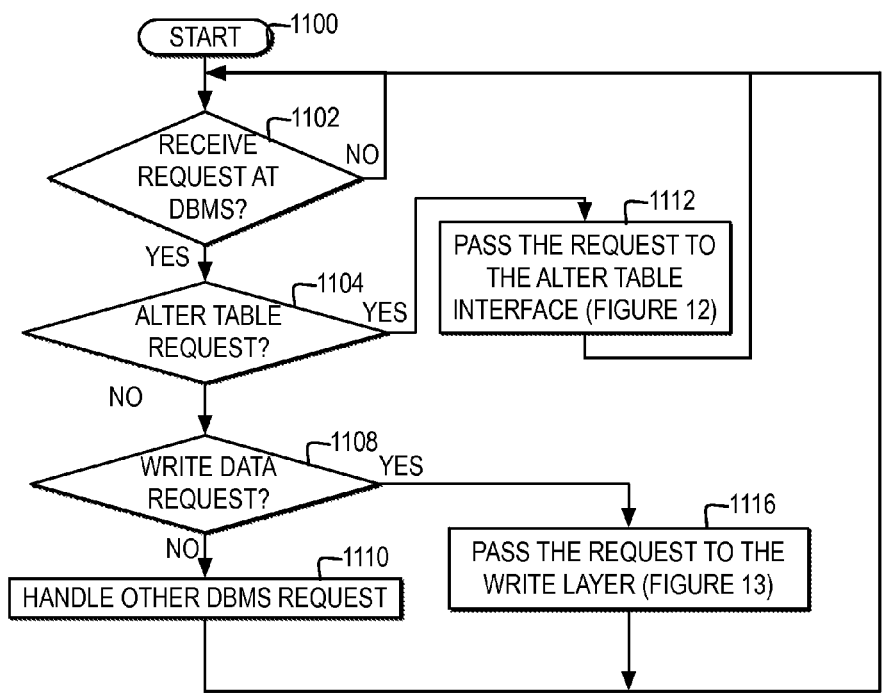
FIG. 11 illustrates a high level logic flowchart of a process and program for managing requests received by a DBMS.
Figure 12:
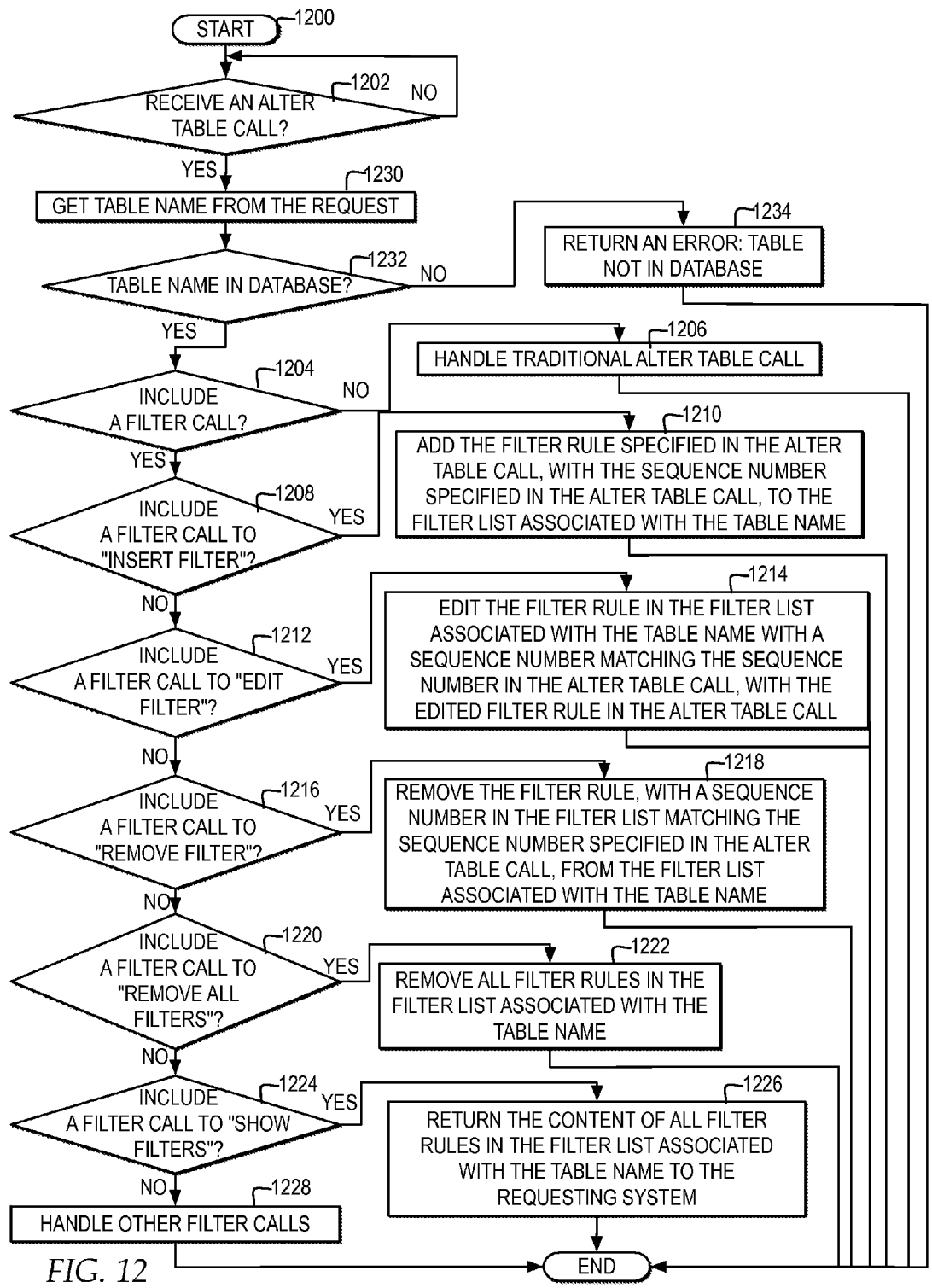
FIG. 12 illustrates a high level logic flowchart of a process and program for managing alter table calls by a DBMS.
Figure 13:
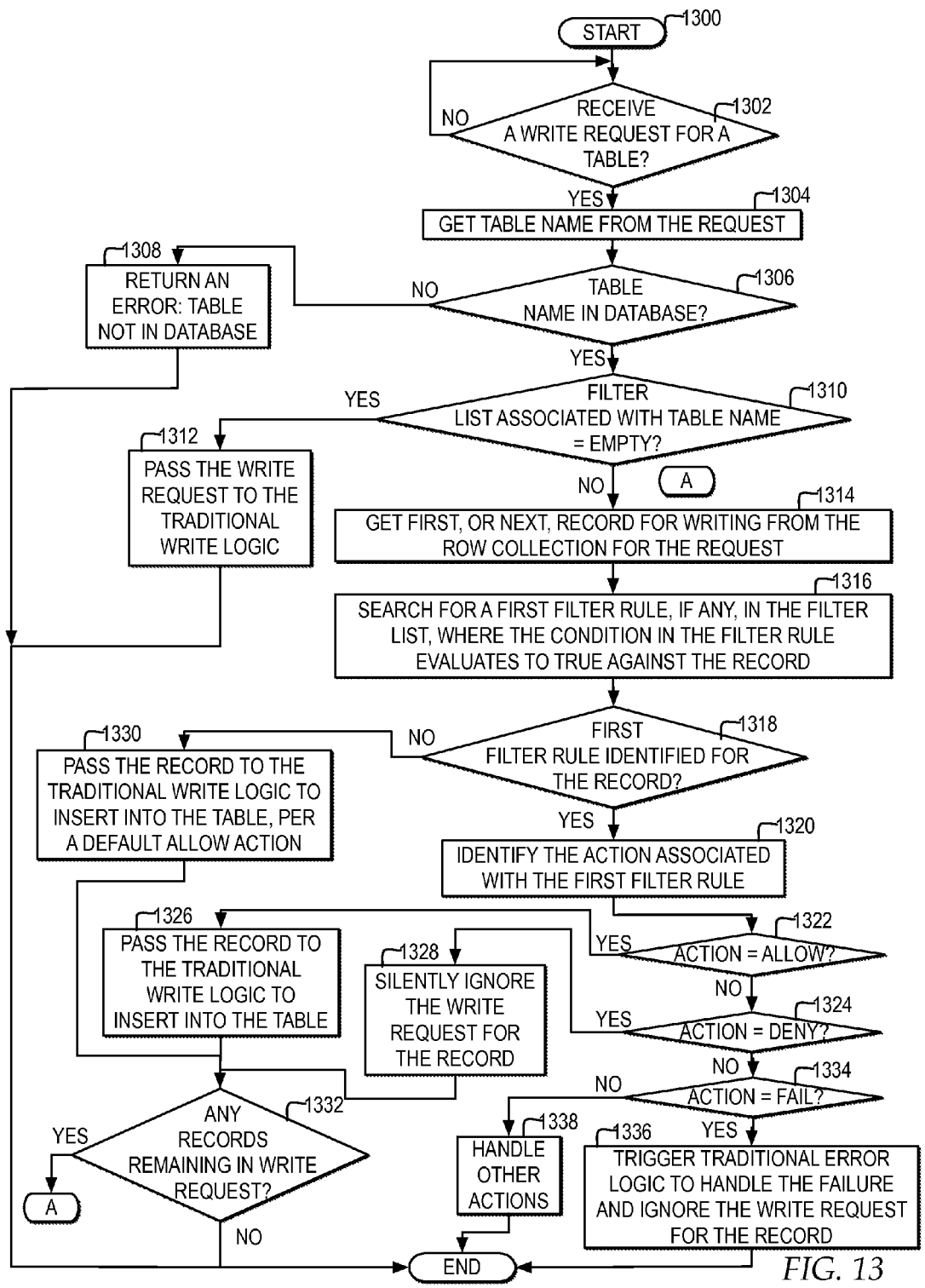
FIG. 13 illustrates a high level logic flowchart of a process and program for managing write data requests by a DBMS.

In one embodiment, the operations performed by processor 1012 may control the operations of flowchart of FIGS. 11-13 and other operations described herein. Operations performed by processor 1012 may be requested by software 1050 or other code or the steps of one embodiment of the invention might be performed by specific hardware components that contain hardwired logic for performing the steps, or by any combination of programmed computer components and custom hardware components.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, micro-code, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 1018, a random access memory (RAM), such as RAM 1014, a read-only memory (ROM) 1016, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, such as computer system 1000, partly on the user's computer, as a stand-alone software package, partly on the user's computer and partly on a remote computer or entirely on the remote computer or server, such as server 1040. In the latter scenario, the remote computer may be connected to the user's computer through any type of network, such as network 1002, through a communication interface, such as network interface 1032, over a network link that may be connected, for example, to network 1002.

In the example, network interface 1032 includes an adapter 1034 for connecting computer system 1000 to network 1002 through a link and for communicatively connecting computer system 1000 to server 1040 or other computing systems via network 1002. Although not depicted, network interface 1032 may include additional software, such as device drivers, additional hardware and other controllers that enable communication. When implemented as a server, computer system 1000 may include multiple communication interfaces accessible via multiple peripheral component interconnect (PCI) bus bridges connected to an input/output controller, for example. In this manner, computer system 1000 allows connections to multiple clients via multiple separate ports and each port may also support multiple connections to multiple clients.

One embodiment of the invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 1000, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 1000, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 1032, the network link to network 1002, and network 1002 may use electrical, electromagnetic, or optical signals that carry digital data streams. The signals through the various networks and the signals on network 1002, the network link to network 1002, and network interface 1032 which carry the digital data to and from computer system 1000, may be forms of carrier waves transporting the information.

In addition, computer system 1000 may include multiple peripheral components that facilitate input and output. These peripheral components are connected to multiple controllers, adapters, and expansion slots, such as input/output (I/O) interface 1026, coupled to one of the multiple levels of bus 1022. For example, input device 1024 may include, for example, a microphone, a video capture device, an image scanning system, a keyboard, a mouse, or other input peripheral device, communicatively enabled on bus 1022 via I/O interface 1026 controlling inputs. In addition, for example, output device 1020 communicatively enabled on bus 1022 via I/O interface 1026 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 10 may vary. Furthermore, those of ordinary skill in the art will appreciate that the depicted example is not meant to imply architectural limitations with respect to the present invention.

FIG. 11 illustrates a high level logic flowchart of a process and program for managing requests received by a DBMS. In the example, the process starts at block 1100 and thereafter proceeds to block 1102. Block 1102 illustrates a determination whether a request is received at a DBMS. At block 1102, if a request is received at a DBMS, then the process passes to block 1104. Block 1104 illustrates a determination whether the request received is an alter table request. At block 1104, if the request received is an alter table request, then the process passes to block 1112. Block 1112 illustrates passing the request to the alter table interface, as illustrated in FIG. 12, and the process returns to block 1102.

Returning to block 1104, if the request received is not an alter table request, then the process passes to block 1108.

Block 1108 illustrates a determination whether the request is a write data request. At block 1108, if the request received is a write data request, then the process passes to block 1116. Block 1116 illustrates passing the request to the write layer, as illustrated in FIG. 13, and the process returns to block 1102. At block 1108, if the request received is not a write data request, then the process passes to block 1110. Block 1110 illustrates handling other DBMS requests, depending on the type of request, and the process returns to block 1102.

FIG. 12 illustrates a high level logic flowchart of a process and program for managing alter table calls by a DBMS. In the example, the process starts at block 1200 and thereafter proceeds to block 1202. Block 1202 illustrates a determination whether an alter table call is received. At block 1202, if an alter table call is received, then the process passes to block 1230.

Block 1230 illustrates getting the table name from the request. Next, block 1232 illustrates a determination whether the table name is in the database. At block 1232, if the table name is not in the database, then the process passes to block 1234. Block 1234 illustrates returning an error of the table name not in the database, and the process ends. Returning to block 1232, if the table name is in the database, then the process passes to block 1204.

Block 1204 illustrates a determination whether the alter table call includes a filter call. At block 1204, if the alter table call does not include a filter call, then the process passes to block 1206. Block 1206 illustrates handling the traditional alter table call, and the process ends. Returning to block 1204, if the alter table call does include a filter call, then the process passes to block 1208.

Block 1208 illustrates a determination whether the alter table call includes a filter call to "insert filter". At block 1208, if the alter table call includes a filter call to "insert filter", then the process passes to block 1210. Block 1210 illustrates adding the filter rule specified in the alter table call, with the sequence number specified in the alter table call, to the filter list associated with the table name, and the process ends. Returning to block 1208, if the alter table call does not include a filter call to "insert filter", then the process passes to block 1212.

Block 1212 illustrates a determination whether the alter table call includes a filter call to "edit filter". At block 1212, if the alter table call includes a filter call to "edit filter", then the process passes to block 1214. Block 1214 illustrates editing the filter rule in the filter list associated with the table name, with a sequence number matching the sequence number in the alter table call, with the edited filter rule in the alter table call, and the process ends. Returning to block 1212, if the alter table call does not include a filter call to "edit filter", then the process passes to block 1216.

Block 1216 illustrates a determination whether the alter table call includes a filter call to "remove filter". At block 1216, if the alter table call includes a filter call to "remove filter", then the process passes to block 1218. Block 1218 illustrates removing the filter rule, with a sequence number in the filter list matching the sequence number specified in the alter table call, from the filter list associated with the table name, and the process ends. Returning to block 1216, if the alter table call does not include a filter call to "remove filter", then the process passes to block 1220.

Block 1220 illustrates a determination whether the alter table call includes a filter call to "remove all filters". At block 1220, if the alter table call includes a filter call to "remove all filters", then the process passes to block 1222. Block 1222 illustrates removing all the filter rules in the filter list associated with the table name, and the process ends. Returning to block 1220, if the alter table call does not include a filter call to "remove all filters", then the process passes to block 1224.

Block 1224 illustrates a determination whether the alter table call includes a filter call to "show filters". At block 1224, if the alter table call includes a filter call to "show filters", then the process passes to block 1226. Block 1226 illustrates returning the content of all the filter rules in the filter list associated with the table name, and the process ends. Returning to block 1224, if the alter table call does not include a filter call to "show filters", then the process passes to block 1228. Block 1228 illustrates handling other filter calls, and the process ends.

FIG. 13 illustrates a high level logic flowchart of a process and program for managing write data requests by a DBMS. In the example, the process starts at block 1300 and thereafter proceeds to block 1302. Block 1302 illustrates a determination whether a write request is received for a table. At block 1302, if a write request is received for a table, then the process passes to block 1304. Block 1304 illustrates getting the table name from the request. Next, block 1306 illustrates a determination whether the table name is in the database. At block 1306, if the table name is not in the database, then the process passes to block 1308. Block 1308 illustrates returning an error that the table is not in the database, and the process ends. Returning to block 1306, if the table name is in the database, then the process passes to block 1310.

Block 1310 illustrates a determination whether the filter list associated with the table name is empty. At block 1310, if the filter list associated with the table name is empty, then the process passes to block 1312. Block 1312 illustrates passing the write request to the traditional write logic, and the process ends. Returning to block 1310, if the filter list associated with the table is not empty, then the process passes to block 1314.

Block 1314 illustrates getting the first, or next, record for writing from the row collection for the request. Next, block 1316 illustrates searching for a first filter rule, if any, in the filter list, where the condition in the filter rule evaluates to true against the record, where the filter rules are numbered, where the filter rules are evaluated in sequential order. Thereafter, block 1318 illustrates a determination whether a first filter rule evaluated to true is identified for the record. At block 1318, if there is not a first filter rule evaluated to true for the record, then the process passes to block 1330. Block 1330 illustrates passing the record to the traditional write logic to insert into the table, per a default allow action, and the process passes to block 1332. Block 1332 illustrates a determination whether there are any records remaining for the write request in the row collection. At block 1332, if there are no remaining records for the write request in the row collection, then the process ends. At block 1332, if there are remaining records for the write request in the row collection, then the process returns to block 1314.

Returning to block 1318, if there is a first filter rule evaluated to true for the record, then process passes to block 1320. Block 1320 illustrates identifying the action associated with the first filter rule evaluated as true, where the action may include one from among the actions of allow, deny, or fail. Next, block 1322 illustrates a determination whether the action associated with the condition in the first filter rule is an allow action. At block 1322, if the action associated with the condition in the first filter rule is an allow action, then the process passes to block 1326. Block 1326 illustrates passing the record to the traditional write logic to insert into the table, and the process passes to block 1332. Returning to block 1322, if the action associated with the condition in the first filter rule is not an allow action, then the process passes to block 1324. Block 1324 illustrates a determination whether the action associated with the condition in the first filter rule is a deny action. At block 1324, if the action associated with the condition in the first filter rule is a deny action, then the process passes to block 1328. Block 1328 illustrates silently ignoring the write request for the record, and the process passes to block 1332. Returning to block 1324, if the action associated with the condition in the first filter rule is not a deny action, then the process passes to block 1334. Block 1334 illustrates a determination whether the action associated with the condition in the first filter rule is a fail action. At block 1334, if the action associated with the condition in the first filter rule is a fail action, then the process passes to block 1336. Block 1336 illustrates triggering traditional error logic to handle the failure and ignoring the write request for the record, and the process ends. At block 1334, if the action associated with the condition in the first filter rule is not a fail action, then the process passes to block 1338. Block 1338 illustrates handling other actions, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for filtering data in an incoming write data request, comprising:
   a computer, receiving a write data request by a filter write controller in a write layer of a database management system, the write data request passed to the filter write controller from a request interface of the database management system that receives a plurality of write data requests from one or more applications requesting to write data to one or more tables from among a plurality of tables of a database;
   the computer, responsive to the filter write controller receiving the write data request, determining whether a particular filter list in the write layer, associated with a particular table from among the plurality of tables specified in the write data request, comprises at least one filter rule, from among a plurality of filter lists each associated with a separate table from among the plurality of tables;
   the computer, responsive to detecting the particular filter list associated with the particular table comprises the at least one filter rule, evaluating content of the at least one record of the write data request for the particular table, against the at least one filter rule specified for the particular table in the particular filter list; and
   the computer selecting, by the filter write controller, whether to allow storage of the at least one record of the write data request as a separate row in the particular table based on a separate action triggered for the at least one record when evaluated against the at least one filter rule specified for the particular table, each record not selected for storage being silently discarded.

2. The method according to claim 1, further comprising:
   the computer, responsive to the filter write controller detecting the particular filter list associated with the particular table is empty, allowing storage of the at least one record of the write data request to the separate row of the particular table.

3. The method according to claim 1, further comprising:
   the computer adding, through a request interface, an additional filter rule for the particular table to the particular filter list by receiving an alter table request specified with an insert filter call comprising the additional filter rule and a sequence number for the additional filter rule; and
   the computer evaluating the content of the at least one record of the write data request received from the application for the particular table against the at least one filter rule and the additional filter rule sequentially according to an order of each separate sequence number assigned to the at least one filter rule and to the additional filter rule.

4. The method according to claim 1, further comprising:
   the computer receiving a request at the request interface of the database management system for managing the database;
   the computer determining, at the request interface, whether a type of the request is the write data request or is an alter table request;
   the computer, responsive to the request interface detecting that the type of the request is the write data request in a structured query language format, passing the write data request to the filter write controller in a control layer of the database management system, wherein the filter write controller selects, for the at least one record in the write data request, whether to allow storage of the at least one record of the write data request as the separate row in the particular table based on the separate action triggered for the at least one record when evaluated against the at least one filter rule specified for the particular table, wherein the separate action comprises one of allow the record to be written to the particular table, deny the record to be written to the particular table and silently discard the record, and trigger a fail controller, and the computer, responsive to the request interface detecting that the type of the request is the alter table request, passing the alter table request to an alter table interface, wherein the alter table interface handles alter table requests comprising at least one filter call.

5. The method according to claim 4, wherein the computer, responsive to the request interface detecting that the request is an alter table request, passing the alter table request to an alter table interface, wherein the alter table interface handles alter table requests comprising at least one filter call, comprises:

responsive to receiving the alter table request at the alter table interface, determining whether the alter table request comprises a filter request for the particular table;

responsive to the alter table request comprising the filter request and comprising an insert filter request, specifying a particular filter rule and a sequence number, inserting the particular filter rule and the sequence number in the particular filter list associated with the particular table specified in the alter table request, wherein the at least one filter rule in the particular filter list associated with the particular table is evaluated in order according to each sequence number, responsive to the alter table request comprising the filter request and comprising an edit filter request, specifying an updated filter rule and the sequence number, editing a selected filter rule within the particular filter list identified by the specified sequence number with the updated filter rule;

responsive to the alter table request comprising the filter request and comprising a remove filter request, specifying a particular sequence number, removing an identified filter rule assigned the particular sequence number from the particular filter list;

responsive to the alter table request comprising the filter request and comprising a remove all filters request, removing the at least one filter rule from the particular filter list; and responsive to the alter table request comprising the filter request and comprising a show all filters request, returning a record of each at least one filter rule from the particular filter list.

6. The method according to claim 1, further comprising:

the computer receiving the write data request from the one or more applications external to the database management system, wherein each at least one application compiles the at least one record with at least one additional record into a row collection comprising a plurality of records directed in the write data request for storage in the particular table.

7. The method according to claim 1, wherein the computer evaluating content of at least one record of the write data request for the particular table, against the at least one filter rule specified for the particular table in the particular filter list comprises:

the computer evaluating, by the filter write controller, whether content of a first record of the at least one record matches the same content specified in a first conditional rule of a first filter rule of the at least one filter rule;

the computer, responsive to the conditional rule being true for the first record, triggering a particular action paired with the conditional rule in the first filter rule for the first record; and the computer, responsive to triggering the particular action paired with the conditional rule in the first filtering rule for the first record, not evaluating the first rule against any remaining rules in the particular filter list;

the computer, responsive to the conditional rule not being true for the first record, determining whether any rules remain in the particular filter list;

the computer, responsive to detecting no rules remain in the particular filter list, automatically selecting to allow the first record to be inserted into the particular table; and the computer, responsive to detecting at least one rule remains in the particular filter list, evaluating whether content of the first record matches the same content specified in a second conditional rule of a second filter rule of the at least one filter rule.

8. The method according to claim 1, the computer evaluating content of at least one record of the write data request for the particular table, against the at least one filter rule specified for the particular table in the particular filter list comprises:

the computer evaluating, by the filter write controller, whether content associated with a particular column attribute of the at least one record matches the same content specified in a first conditional rule for the particular column attribute of a first filter rule of the at least one filter rule; and the computer, responsive to the particular column attribute of the at least one record matching the same content specified in the first conditional rule for the particular column attribute of the first filter rule, setting the separate action to a particular action paired with the first conditional rule for the particular column attribute in the first filter rule, wherein the particular action comprises one of an allow action to allow storage, a deny action to deny storage and return an error message, and a fail action.

9. A computer system, comprising:

one or more processors, one or more computer-readable memories, and one or more computer-readable, storage devices and program instructions, stored on at least one of the one or more storage devices for execution by at least one or more processors via at least one or more memories, the stored program instructions comprising:

program instructions to receive a write data request by a filter write controller in a write layer of a database management system, the write data request passed to the filter write controller from a request interface of the database management system that receives a plurality of write data requests from one or more applications requesting to write data to one or more tables from among a plurality of tables of a database;

program instructions, responsive to the filter write controller receiving the write data request, to determine whether a particular filter list in the write layer, associated with a particular table from among the plurality of tables specified in the write data request, comprises at least one filter rule, from among a plurality of filter lists each associated with a separate table from among the plurality of tables;

program instructions, responsive to detecting the particular filter list associated with the particular table comprises the at least one filter rule, to evaluate, by the filter write controller, content of the at least one record of the write data request for the particular table, against the at least one filter rule specified for the particular table in the particular filter list; and program instructions, to select, by the filtering write controller, whether to allow storage of the at least one record of the write data request as a separate row in the particular table based on a separate action triggered for the at least one record when evaluated against the at least one filter rule specified for the particular table, each record not selected for storage being silently discarded.

10. The computer system according to claim 9, the stored program instructions further comprising:

program instructions, responsive to the filter write controller detecting the particular filter list associated with the particular table is empty, to allow storage of the at least one record of the write data request to the separate row of the particular table.

11. The computer system according to claim 9, the stored program instructions further comprising:

program instructions, to add, through a request interface, an additional filter rule for the particular table to the particular filter list by receiving an alter table request specified with an insert filter call comprising the additional filter rule and a sequence number for the additional filter rule; and program instructions to evaluate the content of the at least one record of the write data request received from the application for the particular table against the at least one filter rule and the additional filter rule sequentially according to an order of each separate sequence number assigned to the at least one filter rule and to the additional filter rule.

12. The computer system according to claim 9, the stored program instructions further comprising:

program instructions to receive a the request at the request interface;

program instructions to determine at the request interface, whether a type of the request is the write data request or is an alter table request;

program instructions responsive to the request interface detecting that the type of the request is the write data request, to pass the write data request to the filter write controller in a control layer of the database management system, wherein the filter write controller selects, for the at least one record in the write data request, whether to allow storage of the at least one record of the write data request as the separate row in the particular table based on the separate action triggered for the at least one record when evaluated against the at least one filter rule specified for the particular table, wherein the separate action comprises one of allow the record to be written to the particular table, deny the record to be written to the particular table and silently discard the record, and trigger fail logic; and program instructions, responsive to the request interface detecting that the type of the request is the alter table request, to pass the alter table request to an alter table interface, wherein the alter table interface handles alter table requests comprising at least one filter call.

13. The computer system according to claim 12, the stored program instructions further comprising:

program instructions, responsive to the alter table interface of the database management system receiving the alter table request, to determine whether the alter table request comprises a filter request for the particular table;

program instructions, responsive to the alter table request comprising the filter request and comprising an insert filter request, specifying a particular filter rule and a sequence number, to insert the particular filter rule and the sequence number in the particular filter list associated with the particular table specified in the alter table request, wherein the at least one filter rule in the particular filter list associated with the particular table is evaluated in order according to each sequence number;

program instructions, responsive to the alter table request comprising the filter request and comprising an edit filter request, specifying an updated filter rule and the sequence number, to edit a selected filter rule within the particular filter list identified by the specified sequence number with the updated filter rule;

program instructions, responsive to the alter table request comprising the filter request and comprising a remove filter request, specifying a particular sequence number, to remove an identified filter rule assigned the particular sequence number from the particular filter list; and program instructions, responsive to the alter table request comprising the filter request and comprising a remove all filters request, to remove the at least one filter rule from the particular filter list.

14. The computer system according to claim 9, the stored program instructions further comprising:

program instructions, to receive the write data request from the one or more applications external to the database management system, wherein each at least one application compiles the at least one record with at least one additional record into a row collection comprising a plurality of records directed in the write data request for storage in the particular table.

15. The computer system according to claim 9, the stored program instructions further comprising:

program instructions, to evaluate whether content of a first record of the at least one record matches the same content specified in a first conditional rule of a first filter rule of the at least one filter rule;

program instructions, the filter write controller, responsive to the conditional rule being true for the first record, to trigger a particular action paired with the conditional rule in the first filter rule for the first record;

program instructions, the filter write controller, responsive to triggering the particular action paired with the conditional rule in the first filtering rule for the first record, to not evaluate the first rule against any remaining rules in the particular filter list;

program instructions, the filter write controller, responsive to the conditional rule not being true for the first record, to determine whether any rules remain in the particular filter list;

program instructions, the filter write controller, responsive to detecting no rules remain in the particular filter list, to automatically select to allow the first record to be inserted into the particular table;

program instructions, the filter write controller, responsive to detecting at least one rule remains in the particular filter list, to evaluate whether content of the first record matches the same content specified in a second conditional rule of a second filter rule of the at least one filter rule.

16. The computer system according to claim 9, the stored program instructions further comprising:

program instructions, to evaluate, by the filter write controller, whether content associated with a particular column attribute of the at least one record matches the same content specified in a first conditional rule for the particular column attribute of a first filter rule of the at least one filter rule; and program instructions, responsive to the particular column attribute of the at least one record matching the same content specified in the first conditional rule for the particular column attribute of the first filter rule, setting the separate action to a particular action paired with the first conditional rule for the particular column attribute in the first filter rule, wherein the particular action comprises one of an allow action to allow storage, a deny action to deny storage and return an error message, and a fail action.

17. A computer program product for filtering data in an incoming write data request, the computer program product comprising one or more computer-readable storage devices and program instructions, stored on at least one of the one or more storage devices, the stored program instructions comprising:

program instructions to receive a write data request by a filter write controller in a write layer of a database management system, the write data request passed to the filter write controller from a request interface of the database management system that receives a plurality of write data requests from one or more applications requesting to write data to one or more tables from among a plurality of tables of a database;

program instructions, responsive to the filter write controller receiving the write data request, to determine whether a particular filter list in the write layer, associated with a particular table from among the plurality of tables specified in the write data request, comprises at least one filter rule, from among a plurality of filter lists each associated with a separate table from among the plurality of tables;

program instructions, responsive to detecting the particular filter list associated with the particular table comprises the at least one filter rule, to evaluate content of the at least one record of the write data request for the particular table, against the at least one filter rule specified for the particular table in the particular filter list; and program instructions, to select whether to allow storage of the at least one record of the write data request as a separate row in the particular table based on a separate action triggered for the at least one record when evaluated against the at least one filter rule specified for the particular table.

18. The computer program product according to claim 17, the stored program instructions further comprising:

program instructions, responsive to the filter write controller detecting the particular filter list associated with the particular table is empty, to allow storage of the at least one record of the write data request to the separate row of the particular tablet.

19. The computer program product according to claim 17, the stored program instructions further comprising:

program instructions to add, through a request interface, an additional filter rule for the particular table to the particular filter list by receiving an alter table request specified with an insert filter call comprising the additional filter rule and a sequence number for the additional filter rule; and program instructions to evaluate the content of the at least one record of the write data request received from the application for the particular table against the at least one filter rule and the additional filter rule sequentially according to an order of each separate sequence number assigned to the at least one filter rule and to the additional filter rule.

20. The computer program product according to claim 17, the stored program instructions further comprising:

program instructions to receive a request at the request interface of the database management system for managing the database;

program instructions to determine at the request interface, whether a type of the request is the write data request or is an alter table request;

the program instructions responsive to detecting that the type of the request is the write data request, to pass the write data request to the filter write controller in the write layer in a control layer of the database management system, wherein the filter write controller selects, for the at least one record in the write data request, whether to allow storage of the at least one record of the write data request as the separate row in the particular table based on the separate action triggered for the at least one record when evaluated against the at least one filter rule specified for the particular table, wherein the separate action comprises one of allow the record to be written to the particular table, deny the record to be written to the particular table and silently discard the record, and trigger fail logic; and program instructions, responsive to detecting that the type of the request is the alter table request, to pass the alter table request to an alter table interface, wherein the alter table interface handles alter table requests comprising at least one filter call.

* * * * *